United States Patent [19]
Naoki et al.

[11] Patent Number: 5,260,929
[45] Date of Patent: Nov. 9, 1993

[54] OPTICAL DISK DRIVE INCLUDING DUST-PROOFING ANNULAR PROJECTIONS

[75] Inventors: Goro Naoki; Kazuo Momoo; Shoji Goto; Ichiro Kawamura; Hiroshi Yamamoto, all of Osaka, Japan

[73] Assignee: Matsushita Electric Industrial Co., Ltd., Osaka, Japan

[21] Appl. No.: 696,413

[22] Filed: May 6, 1991

[30] Foreign Application Priority Data

May 8, 1990 [JP] Japan .................................. 2-119352

[51] Int. Cl.$^5$ ................................................ G11B 7/12
[52] U.S. Cl. ............................... 369/118; 369/44.14
[58] Field of Search .................. 369/118, 44.14, 44.11, 369/44.26, 112, 32, 219, 220

[56] References Cited

U.S. PATENT DOCUMENTS 4,554,653 11/1985 Malissin et al. .
4,958,335 9/1990 Takeda et al. .................... 369/44.14

FOREIGN PATENT DOCUMENTS

0088662A1 9/1983 European Pat. Off. .
0346479A1 12/1989 European Pat. Off. .
61-122947 6/1986 Japan .
63-113942 5/1988 Japan .................................. 369/44.14

Primary Examiner—Paul M. Dzierzynski
Assistant Examiner—Jim Beyer
Attorney, Agent, or Firm—Lowe, Price, LeBlanc & Becker

[57] ABSTRACT

An optical disk drive of the type having a fixed optical unit having a light transmitting hole from which a laser beam is emitted, and a movable head having a light receiving hole from which the laser beam is received, wherein the respective outer edges of the light emitting and receiving holes are surrounded by a pair of annular projections. The annular projections are engageable with each other to provide a seal therebetween when the head is displaced toward the fixed optical unit. The annular projections are preferably made of a cushioning material in which instance they also serve as a cushioning or shock-absorbing member.

8 Claims, 2 Drawing Sheets

OPTICAL DISK DRIVE INCLUDING DUST-PROOFING ANNULAR PROJECTIONS

BACKGROUND OF THE INVENTION

1. Field of the Invention

The present invention relates generally to optical disk drives of the separate type in which a head for focusing a laser beam onto a recording disk is transferred relative to a fixed optical unit constituting an optical processing means including a light source for emitting the laser beam. More particularly, it is concerned with improvements in a dust-proofing structure between confronting surfaces of the fixed optical unit and the head of the separate type optical disk drive.

2. Description of the Prior Art

Optical disk drives are a data processing means which is capable of recording/reproducing the bulk of information and, therefore, they are widely used in various fields of application such as computers, office automation equipment and domestic composite apparatus as a recording/reproducing means.

The optical disk drives are so constructed as to record and read information on a disk-type recording medium such as an optical disk by using a laser beam. Since a unit piece of information to be recorded or reproduced by the laser beam correspond to a very tiny spot on the optical disk, a path of travel of the laser beam must always be kept clean.

With a wide diversity in application surroundings in view, a keen demand has been voiced for an optical disk drive which is highly resistant to dust and dirt.

A conventional optical disk drive includes, as shown in FIG. 4, a recording disk 1 on which data signals are recorded, a drive motor 2 for rotating the recording disk 1, a fixed optical unit 3 including a light source (not shown) for emitting a laser beam, a head 4 for focusing the laser beam onto a recording surface of the recording disk 1 and for being transferred back-and-forth in the direction indicated by the arrowheads Y1 and Y2, a pair of parallel spaced guide shafts 5 and 5 along which the head 4 is guided in the direction of the arrowheads Y1 and Y2, a pair of coils 6 and 6 mounted on opposite sides of the head 4, and a pair of parallel spaced elongate magnets 7 and 7 extending through the coils 6, 6, respectively, for generating a driving force to transfer the head 4. The laser beam emitted from the fixed optical unit 3 toward the head 4 advances along an optical path 8 indicated by the dashed line. The fixed optical unit 3 has a circular hole 9 defining one end of the optical path 8, while the head 4 has a circular hole 10 aligned with the hole 9 and defining the opposite end of the optical path 8. A cushioning member 12 made of rubber, for example, is disposed between two confronting surfaces of the fixed optical unit 3 and the head 4 to prevent the head 4 from impinging upon the fixed optical unit 3.

The conventional optical disk drive of the foregoing construction operates as follows.

By controlling the magnitude of an electric current supplied to the coils 6, the coils 6 produce a driving force needed for transferring the head 4. The head 4 is displaced back-and-forth along the shafts 5 in the direction indicated by the arrowheads Y1 and Y2. During the reciprocating movement of the head 4 in the direction of the arrowheads Y1 and Y2, the optical path 8 is always maintained without interruption, so that the laser beam is continuously supplied through the aligned holes 9 and 10 to the head 4. Thus, the head 4 is transferred over the recording surface of the recording disk 1 radially between the outer edge and the inner edge of the recording disk 1, thereby performing recording and reproducing operations.

Since the holes 9, 10 on the optical path 8 are exposed to the exterior, dust can easily get in the holes 9, 10. Particularly when the recording disk 1 contained in a protective cartridge (not shown) is loaded in the optical disk drive, it occurs likely that the cartridge is inserted with foreign matter or dust adhering on it. In this instance, when the cartridge is subjected to an impact force at the time of driving the recording disk 1, dust is likely to separate from the cartridge and then adhere to the circumferential walls of the holes 9, 10. The dust is accumulated on the circumferential walls of the holes 9, 10 as the loading and unloading operations are repeated. Due to the presence of foreign matter or dust on the path 8 of travel of the laser beam, the performance characteristics of the optical disk drive are significantly deteriorated.

SUMMARY OF THE INVENTION

With the foregoing drawbacks of the prior art in view, it is an object of the present invention to provide an optical disk drive having a dust-proofing structure which is capable of preventing dust or the like from entering into a light emitting hole in a fixed optical unit or a light receiving hole in a head, and thereby preventing the interruption of the light path which would otherwise be caused by the adhesion of dust to the circumferential wall of the light emitting hole or the light receiving hole.

Another object of the present invention is to provide an optical disk drive which excels in dust-proofing and cushioning properties and can be manufactured at a low cost.

According to the present invention, there is provided an optical disk drive for recording and reproducing information on a recording disk, comprising: a fixed optical unit for rotatably supporting the recording disk and capable of emitting a laser beam, the fixed optical unit having a light emitting hole from which the laser beam is emitted; a head movably mounted on the fixed optical unit for focusing the laser beam onto a recording surface of the recording disk, the head having a light receiving hole aligned with the light emitting hole for receiving the laser beam emitted from the light emitting hole; means for transferring the head in a radial direction of the recording disk; and an annular projection disposed on at least one of the fixed optical unit and the head and surrounding an outer edge of corresponding one of the light emitting hole and the light receiving hole.

Since the outer edge of at least one of the light emitting hole and the light receiving hole is surrounded by an annular projection, it is possible to prevent dust or the like from entering into the corresponding hole and thereby to prevent the interruption of a path of travel of the laser beam.

Preferably, the annular projection is disposed on both of the fixed optical unit and the head. Two such annular projections are engageable with each other to provide a seal therebetween when the head is transferred relative to the fixed optical unit in a direction to move the light receiving hole toward the light emitting hole. The seal thus provided effectively protects the light emitting and receiving holes against intrusion of dust which would otherwise occur frequently at the time of loading and unloading of the recording disk relative to the optical disk drive.

The annular projection is preferably made of a cushioning material in which instance the annular projection serves also as a shock absorber to minimize the acceleration of the head relative to the fixed optical unit and thereby to prevent the collision between the head and the fixed optical unit.

The above and other objects, features and advantages of the present invention will become more apparent from the following description when making reference to the detailed description and the accompanying sheets of drawings in which preferred structural embodiments incorporating the principles of the present invention are shown by way of illustrative example.

DETAILED DESCRIPTION OF THE PREFERRED EMBODIMENTS

The present invention will be described below in detail with reference to certain preferred embodiments shown in the accompanying drawings.

Figure 1:
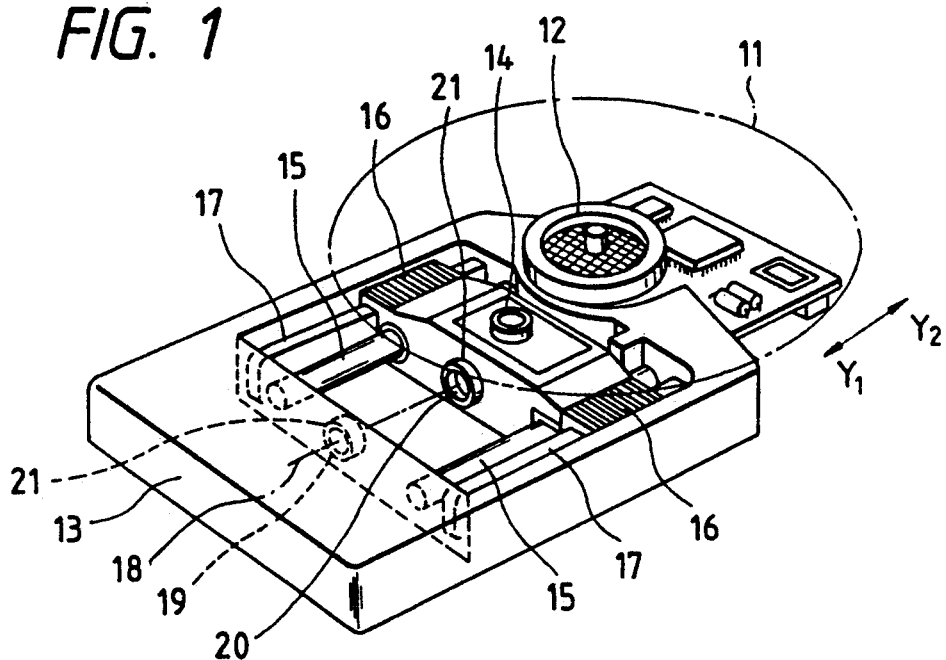
FIG. 1 is a schematic perspective view of an optical disk drive according to the present invention.

FIG. 1 schematically shows the general construction of an optical disk drive according to the present invention. The optical disk drive is used with a recording disk 11 such as an optical disk for recording and reproducing information in terms of digital data signals while the recording disk 11 is being rotated by a drive motor 12 of the optical disk drive. The optical disk drive includes a fixed optical unit 13 serving as a light source for emitting a laser beam, a head 14 movably mounted on the fixed optical unit 13 for focusing the laser beam onto a recording surface of the recording disk 11 and reciprocally movable in a radial direction of the recording disk 11 as indicated by the arrowheads Y1 and Y2, and means for transferring the head 14 in the direction of the arrowheads Y1 and Y2. The transferring means includes a pair of parallel spaced guide shafts 15 and 15 supported by the fixed optical unit 13 and extending in a direction parallel to the direction of the arrowheads Y1 and Y2 for slidably guiding therealong the head 14, a pair of coils 16 and 16 disposed on opposite sides of the head 14, and a pair of parallel spaced elongate magnets 17 and 17 supported by the fixed optical unit 13 and extending through the coils 16, 16, respectively, for producing a driving force to move the head 14 along the guide shafts 15 in the direction of the arrowheads Y1 and Y2.

The laser beam emitted from the fixed optical unit 13 toward the head 14 advances along an optical path 18 indicated by the dashed line. The fixed optical unit 13 has a circular light emitting hole 19 defining one end of the optical path 18, while the head 14 has a circular light receiving hole 20 aligned with the light emitting hole 19 and defining the opposite end of the optical path 18. With the holes 19, 20 thus provided, the laser beam emitted from the fixed optical unit 13 outgoes from the light emitting hole 19 and subsequently moves from the light receiving hole 20 into the head 14. When the optical disk drive is not loaded with the recording disk 11, the head 14 is disposed in its retracted position shown in FIG. 3 (corresponding to an end extremity of the movement of the head 14 in the direction of the arrowhead Y1).

The optical disk drive of the foregoing construction operates as follows.

After a recording disk 11 is loaded on the optical disk drive, a controlled quantity of electric current is supplied to the coils 16, 16 to excite the same whereupon the coils 16 produce a corresponding driving force needed for transferring the head 14. The head 14 is therefore displaced back-and-forth along the shafts 15 in the direction indicated by the arrowheads Y1 and Y2. During the reciprocating movement of the head 14 in the direction of the arrowheads Y1 and Y2, the optical path 18 is always maintained without interruption, so that the laser beam emitted from the fixed optical unit 13 is continuously supplied through the aligned light emitting and receiving holes 19 and 20 into the head 14. Thus, the head 14 is transferred over the recording surface of the recording disk 11 in the radial direction thereof between the outer edge and the inner edge of the recording disk 11 while performing recording and reproducing operations.

According to an important feature of this invention, an outer edge of each of the light emitting hole 19 and the light receiving hole 20 is surrounded by an annular projection 21 disposed on corresponding one of the fixed optical unit 13 and the head 14. The annular projections 21 may be provided only one of the fixed optical unit 13 and the head 14. The annular projections 21 are preferably made of a cushioning material such as rubber, so that they serve as a dust-proofing member and also as a cushioning or shock-absorbing member. Eligible materials for the dust-proofing and cushioning members or projections 21 include synthetic rubber such as silicone rubber, urethane rubber, fluororubber, polysulfide rubber, Hypalon (a trademark of duPont), ethylene-propylene copolymer (EPM), ethylenepropylene terpolymer (EPDM), polyisoprene rubber, polybutadiene rubber, styrene-butadiene rubber (SBR), acrylonitrile-butadiene rubber (NBR), chloroprene rubber (CR), isobutylene-isoprene rubber (IIR), diene-based liquid rubber and rubber composed of ABS resin compounds, and natural rubber.

Figure 2A:
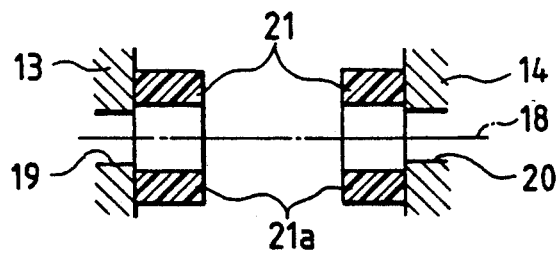
FIG. 2(a) is an enlarged cross-sectional view showing a pair of confronting dust-proofing and cushioning members of the optical disk drive.

The annular projections (dust-proofing and cushioning members) 21, as shown in FIG. 2(a), are composed of two identical hollow cylinders or tubes having flat confronting front surfaces 21a, 21a which are sealingly engageable with each other.

Figure 2B:
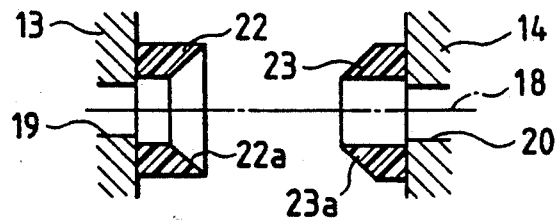
FIGS. 2(b) and 2(c) are views similar to FIG. 2(a), showing modified forms of the dust-proofing and cushioning members.

FIG. 2(b) shows a modified form of the annular projections 21. The modified annular projections are composed of a first annular projection 22 disposed on the fixed optical unit 13 and having a conical recess in its front surface 22a, and a second annular projection 23 disposed on the head 14 and having a beveled or tapered front surface 23a complementary in contour to the shape of the recessed front surface 22a of the first annular projection 22. When the head 14 is moved toward the fixed optical unit 13, the beveled front surface 23a is brought into fitting engagement with the recessed front surface 22a, thereby forming a seal therebetween.

Figure 2C:
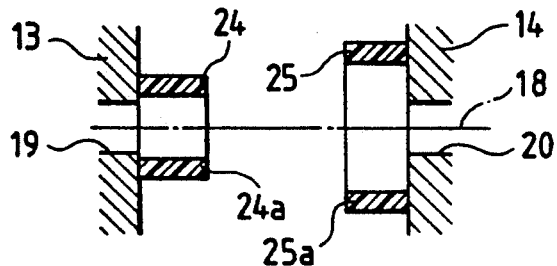

Another modified form of the annular projections shown in FIG. 2(c) comprises a first annular projection 24 disposed on the fixed optical unit 13 and having an outside diameter which is smaller than the inside diameter of a second annular projection 25 disposed on the head 14. The first and second annular projections 24, 25 have a same height so that when the head 14 is disposed in its retracted position shown in FIG. 3, the first annular projection 24 is received in the second annular projection 25 with respective flat front surfaces 24a, 25a held in abutment with the head 14 and the fixed optical unit 13, respectively.

The annular projections 21, 22 and 23 shown in FIGS. 2(a) and 2(b) may be 10 mm in outside diameter, 6 mm in inside diameter, 2 mm in thickness and 1 mm in height.

Figure 4:
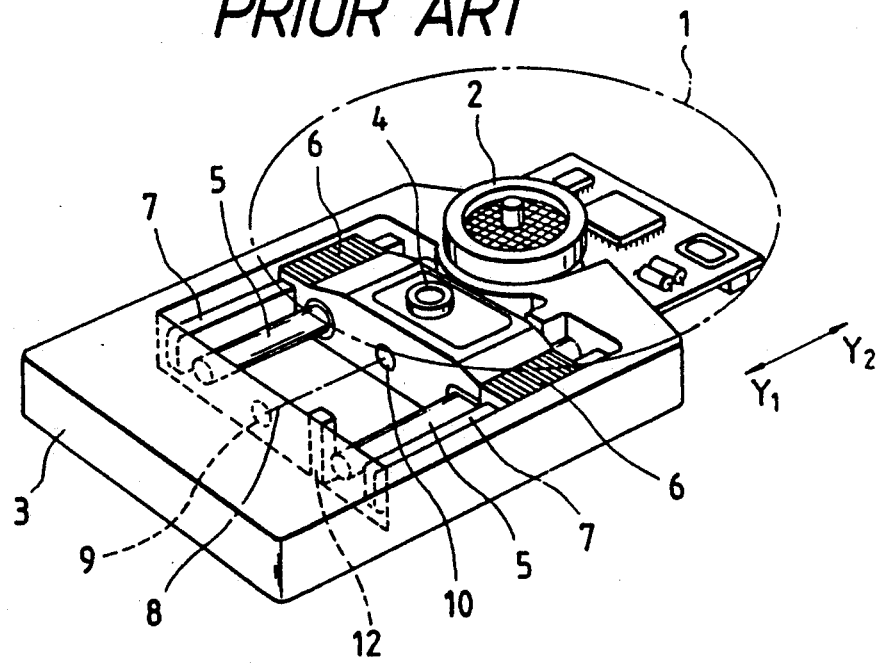
FIG. 4 is a schematic perspective view of a conventional optical disk drive.

Since the annular projections 21, 21; 22, 23; 24, 25 made of a cushioning material, they serve as a cushioning member which is comparable in function to the cushioning member 11 of the conventional optical disk drive shown in FIG. 4. With the annular projections 21, 21; 22, 23; 24, 25 thus provided, the acceleration of the head 14 relative to the fixed optical unit 13 can be effectively reduced. In addition, since the respective outer edges of the light emitting hole 19 and the light receiving hole 20 are surrounded by the annular projections 21, 21; 22, 23; 24, 25, the annular projections 21, 21; 22, 23; 24, 25 also serve as dust-proofing hoods for the respective holes 19, 20. The dust-proofing hoods thus provided are highly effective in preventing dust or the like from entering into the holes 19, 20.

Figure 3:
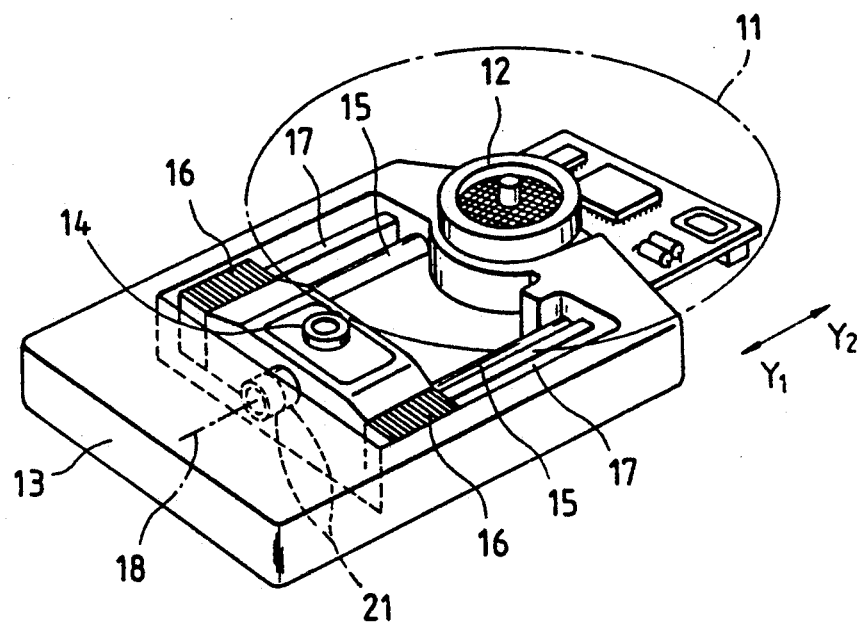
FIG. 3 is a view similar to FIG. 1, but showing the optical disk drive with its optical path is concealed by the dust-proofing and cushioning members held in abutment with each other.

Furthermore, when the head 14 is disposed in its retracted position adjacent to the fixed optical unit 13, as shown in FIG. 3, the annular projections 21, 21; 22, 23 are brought into sealing engagement with each other to conceal the optical path 18 and the holes 19, 20 from the exterior. In this instance, dust or the like is no longer possible to enter the holes 19, 20. In the case of the annular projections 24, 25 shown in FIG. 2(c), the first and second annular projections 24 and 25 sealingly engage the head 14 and the fixed optical unit 13, respectively, with the first annular projection 24 received in the second annular projection 25, so that the holes 19, 20 and the optical path 18 are fully concealed by the annular projections 24, 25 and hence completely protected against dust.

It is preferable that when the optical disk drive is not loaded with the recording disk 11, the head 14 is disposed in the retracted position shown in FIG. 3 so as to keep the holes 19, 20 closed by the annular projections 21, 21; 22, 23; 24, 25. In order to displace the head 14 toward the fixed optical unit 13 until arrival of the head 14 at the retracted position, the transfer means may be activated. As an alternative, it is possible to operatively link the head 14 with a conventional loading and unloading mechanism (not shown) which is incorporated in the optical disk drive for loading and unloading the recording disk 11 relative to the drive motor 12. This arrangement is preferable because the loading and unloading operation frequently involves generation of dust. Though not shown, the loading and unloading mechanism is interlocked with an ejector for ejecting the recording disk 11 and includes means for urging an arm in a direction to move the head 14 toward the fixed optical unit 13 until the holes 19, 20 are concealed by the annular projections 21, 21; 22, 23; 24, 25 as long as the ejector is disposed in its operating position.

In the foregoing embodiments, the annular projections 21, 21; 22, 23; 24, 25 are disposed around the outer edges of the holes 19, 20. However, a sufficient dust-proofing and cushioning effect can be obtained even when only one annular projection 21; 22 or 23; 24 or 25 is provided for the light emitting hole 19 or the light receiving hole 20.

The annular projections 21, 21; 22, 23; 24, 25 of the illustrated embodiments are made or a cushioning material such as rubber for purposes of providing a cushioning effect. When the dust-proofing properties are important, the annular projections 21, 21; 22, 23; 24, 25 may be made of synthetic resin or metal. In this instance, however, the cushioning effect is not expected.

Though not shown, the prevent invention is also useful when embodied in an optical disk drive which comprises: first optical processing means for recording and reproducing information on a recording disk by using a laser beam, the first optical processing means having a light source for generating the laser beam and a light emitting hole from which the laser beam is emitted; second optical processing means having a light receiving hole for receiving the laser beam emitting from the first optical processing means and an objective lens for focusing the laser beam onto the recording disk; means for transferring the second optical processing means in a radial direction of the recording disk; and a first engagement portion and a second engagement portion disposed respectively around outer edges of the light emitting hole and the light receiving hole, the first and second engagement portions being engageable with each other to conceal the light emitting and receiving holes when the second optical processing means is moved toward the first optical processing means.

As described above, when the fixed optical unit and the head are moved relatively toward each other, the light emitting hole in the fixed optical unit and the light receiving hole in the head are concealed from exterior by means of the annular projections disposed on confronting surfaces of the fixed optical unit and the head. The holes are, therefore, completely protected against dust. In addition, the annular projections also serve as a cushioning member for minimizing the acceleration of the head relative to the fixed optical unit. The annular projections thus provided obviates the necessity of providing a separate cushioning member between the fixed optical unit and the head. Thus, the optical disk drive of this invention excels in dust-proofing and cushioning properties and can be manufactured at a low cost.

Obviously, various minor changes and modifications of the present invention are possible in the light of the above teaching. It is therefore to be understood that within the scope of the appended claims the invention may be practiced otherwise than as specifically described.

What is claimed is:

1. An optical disk drive for recording and reproducing information on a recording disk, comprising:
    (a) a fixed optical unit for rotatably supporting the recording disk and capable of emitting a laser beam, said fixed optical unit having a light emitting hole from which said laser beam is emitted;
    (b) a head movably mounted on said fixed optical unit for focusing said laser beam onto a recording surface of the recording disk, said head having a light receiving hole aligned with said light emitting hole for receiving said laser beam emitted from said light emitting hole;

(c) means for transferring said head in a radial direction of the recording disk; and (d) an annular projection disposed on both of said fixed optical unit and said head, said annular projections facing each other and surrounding an outer edge of said light emitting hole and said light receiving hole, respectively.

2. An optical disk drive for recording and reproducing information on a recording disk, comprising:

(a) a fixed optical unit for rotatably supporting the recording disk and capable of emitting a laser beam, said fixed optical unit having a light emitting hole from which said laser beam is emitted;

(b) a head movably mounted on said fixed optical unit for focusing said laser beam onto a recording surface of the recording disk, said head having a light receiving hole aligned with said light emitting hole for receiving said laser beam emitted from said light emitting hole;

(c) means for transferring said head in a radial direction of the recording disk; and (d) an annular projection disposed on at least one of said fixed optical unit and said head, and surrounding an outer edge of a corresponding one of said light emitting hole and said light receiving hole, wherein said annular projection is disposed on both of said fixed optical unit and said head, two said annular projections being engageable with each other to provide a seal therebetween when said head is transferred relative to said fixed optical unit in a direction to move said light receiving hole toward said light emitting hole.

3. An optical disk drive according to claim 2, wherein said two annular projections have flat front surfaces sealingly engageable with each other.

4. An optical disk drive according to claim 2, wherein one of said two annular projections has a recessed front surface and the other of said two annular projections has a front surface complementary in contour to the shape of a recess in said front surface of said one annular projection.

5. An optical disk drive according to claim 2, wherein said two annular projections are made of a cushioning material.

6. An optical disk drive for recording and reproducing information on a recording disk, comprising:

(a) a fixed optical unit for rotatably supporting the recording disk and capable of emitting a laser beam, said fixed optical unit having a light emitting hole from which said laser beam is emitted;

(b) a head movably mounted on said fixed optical unit for focusing said laser beam onto a recording surface of the recording disk, said head having a light receiving hole aligned with said light emitting hole for receiving said laser beam emitted from said light emitting hole;

(c) means for transferring said head in a radial direction of the recording disk; and (d) an annular projection disposed on at least one of said fixed optical unit and said head, and surrounding an outer edge of a corresponding one of said light emitting hole and said light receiving hole, wherein said annular projection is disposed on both of said fixed optical unit and said head, one of said two annular projections having an outside diameter which is smaller than the inside diameter of the other one of said two annular projections.

7. An optical disk drive according to claim 6, wherein said two annular projections are made of a cushioning material.

8. An optical disk drive for recording and reproducing information on a recording disk, comprising:

(a) a fixed optical unit for rotatably supporting the recording disk and capable of emitting a laser beam, said fixed optical unit having a light emitting hole from which said laser beam is emitted;

(b) a head movably mounted on said fixed optical unit for focusing said laser beam onto a recording surface of the recording disk, said head having a light receiving hole aligned with said light emitting hole for receiving said laser beam emitted from said light emitting hole;

(c) means for transferring said head in a radial direction of the recording disk; and (d) an annular projection disposed on at least one of said fixed optical unit and said head, and surrounding an outer edge of a corresponding one of said light emitting hole and said light receiving hole, wherein said annular projection is made of a cushioning material.

* * * * *